United States Patent
Durfee, Jr.

(10) Patent No.: US 7,686,553 B2
(45) Date of Patent: Mar. 30, 2010

(54) PRECISION POSITIONING AND FASTENING SYSTEM

(76) Inventor: David L. Durfee, Jr., 14527 Rt. 98, Meadville, PA (US) 16335

( * ) Notice: Subject to any disclaimer, the term of this patent is extended or adjusted under 35 U.S.C. 154(b) by 465 days.

(21) Appl. No.: 11/214,347

(22) Filed: Aug. 29, 2005

(65) Prior Publication Data
US 2007/0025826 A1   Feb. 1, 2007

Related U.S. Application Data

(60) Provisional application No. 60/605,057, filed on Aug. 27, 2004.

(51) Int. Cl.
F16B 35/00 (2006.01)
B23Q 3/00 (2006.01)
(52) U.S. Cl. .................. 411/107; 403/14; 403/353; 248/222.41; 269/305; 269/902
(58) Field of Classification Search ............. 411/999, 411/107, 353; 403/13, 14, 353; 248/13, 248/14, 353, 221.11, 220.31, 220.41, 222.41; 269/46, 305, 902
See application file for complete search history.

(56) References Cited

U.S. PATENT DOCUMENTS

| | | | | |
|---|---|---|---|---|
| 3,041,913 A * | 7/1962 | Liska | ............................ | 411/87 |
| 3,263,549 A * | 8/1966 | Jordan et. al. | ............ | 83/698.91 |
| 3,812,895 A * | 5/1974 | Smith | .......................... | 411/352 |
| 3,977,801 A * | 8/1976 | Murphy | ...................... | 248/188 |
| 4,212,224 A * | 7/1980 | Bragg et al. | ................ | 411/337 |
| 4,343,581 A * | 8/1982 | Millheiser | ...................... | 411/353 |
| 4,630,811 A * | 12/1986 | Rudisill | ...................... | 269/118 |
| 4,828,240 A * | 5/1989 | Longenecker et al. | ......... | 269/47 |
| 4,968,012 A * | 11/1990 | Haddad et al. | ................ | 269/88 |
| 5,139,361 A * | 8/1992 | Camuffo | .................. | 403/408.1 |
| 5,253,944 A * | 10/1993 | Preston | ........................ | 403/13 |
| 5,788,225 A * | 8/1998 | Iwata et al. | ................. | 269/309 |
| 5,941,669 A * | 8/1999 | Aukzemas | .................. | 411/107 |
| 6,406,209 B1 * | 6/2002 | Liu et al. | ....................... | 403/13 |
| 6,908,276 B2 * | 6/2005 | Dohm | ......................... | 411/533 |

* cited by examiner

*Primary Examiner*—Flemming Saether
(74) *Attorney, Agent, or Firm*—Richard K Thomson

(57) ABSTRACT

A locator/fastener has a first outer member with a precision-machined external body portion, a retention head protruding from a first end, and a multi-diameter throughbore. A fastener, which may take the form of a cap screw, floats in the throughbore of the locator with the threaded portion protruding from a second end of the locator. A receiver has an internal precision-machined surface which contacts the precision-machined body portion of the locator and a threaded bore which receives the protruding fastener. By separating the locating and fastening functions, a quick connect disconnect device is created which does not bind or gall. A hangar system allows a sub-base plate to be attached to a base using the locator-fastener disclosed herein.

11 Claims, 11 Drawing Sheets

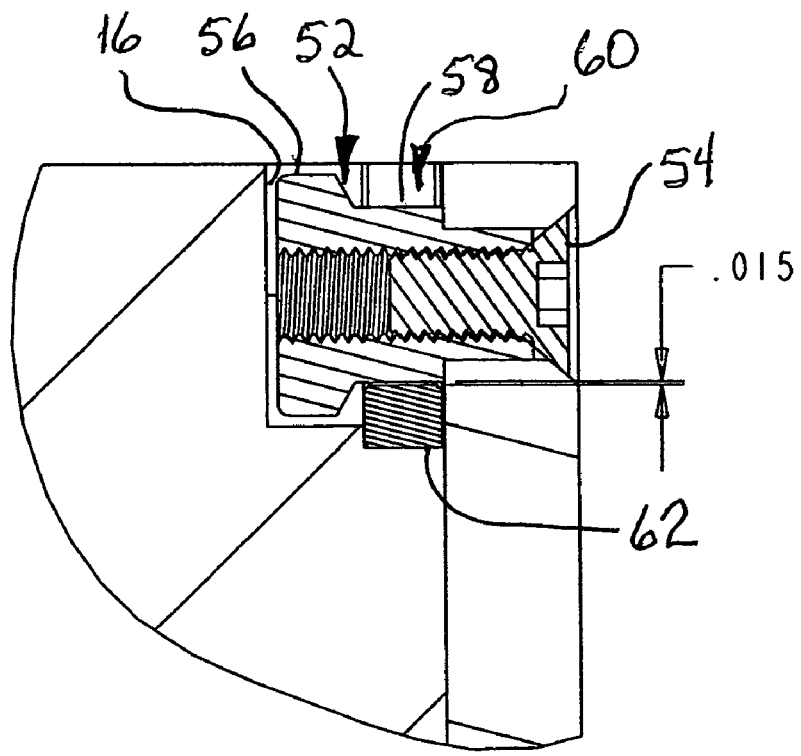
Figure 3C
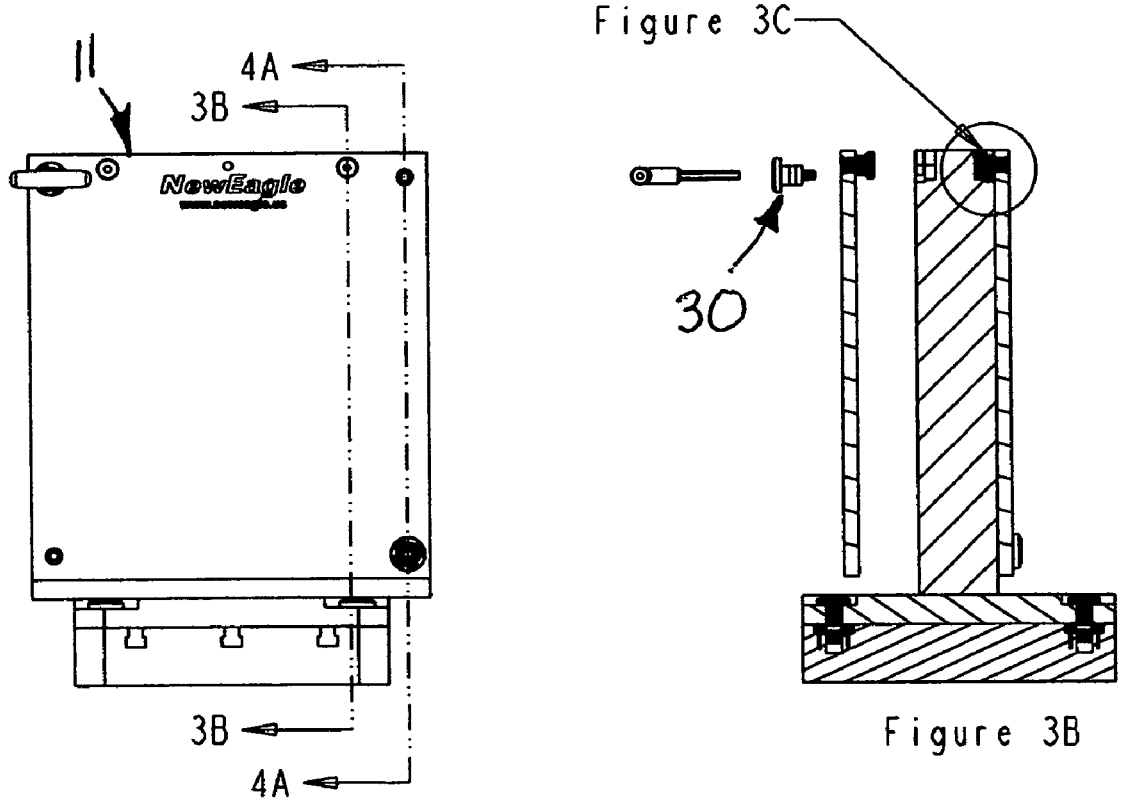
Figure 3A
Figure 3B

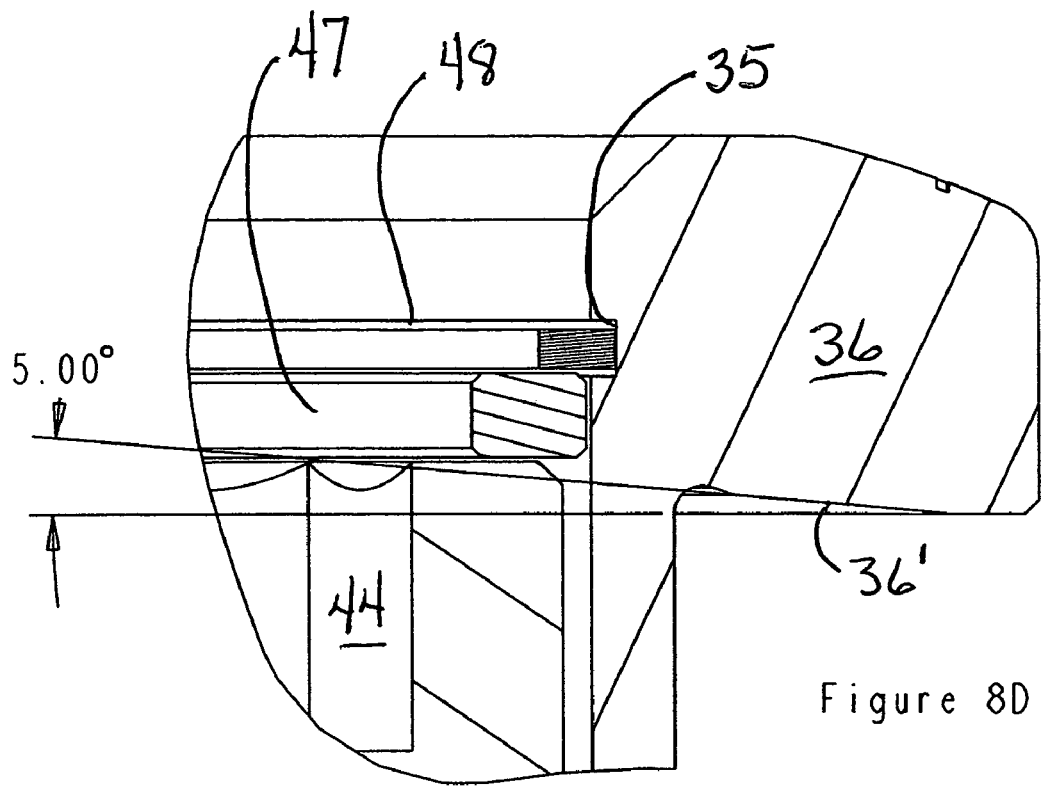
Figure 8D
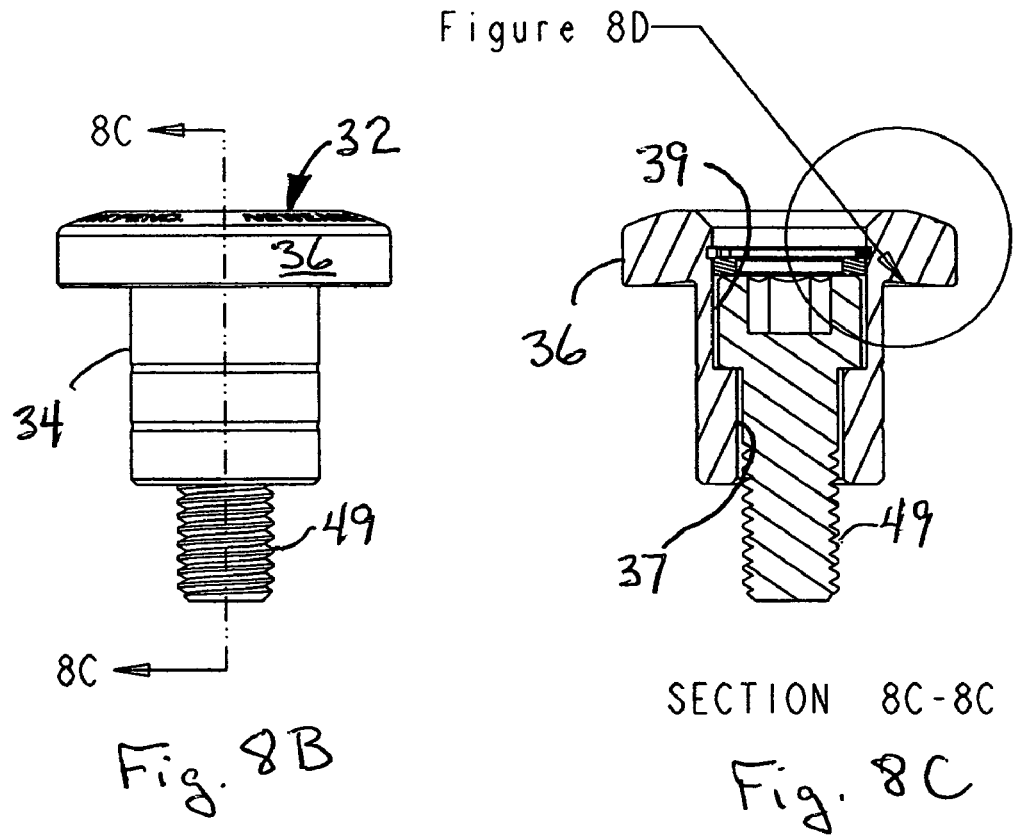
Fig. 8B
SECTION 8C-8C
Fig. 8C

PRECISION POSITIONING AND FASTENING SYSTEM

Applicant claims benefit of provisional patent application 60/605,057 filed Aug. 27, 2004.

BACKGROUND AND SUMMARY OF THE INVENTION

The present invention is directed to the field of precision fastening. More particularly, the present invention is directed to a precision locating and fastening system particularly useful in securing work pieces to a work holder for machining operations.

Currently, devices for locating and anchoring articles include dowel pins, a variety of fasteners including shoulder bolts, key ways including T-keys and T-bolts, for example. Dowel pins and other fasteners are adequate for some applications but are not without their limitations. Firstly, when quick connect/disconnect is desired, dowel pins and threaded fasteners typically are found wanting. Dowel pins, for example, require application of axial force and removing the dowels can be time consuming. Typically, dowel pins are used for locating an article and other forms of fasteners are used to secure the item. This use of two different systems mitigates against a quick connect/disconnect.

Shoulder bolts can be used for both locating and fastening. A shoulder bolt is asked to do both the aligning of the attached articles and the fastening/securing of those items. Accordingly, when there is misalignment between the attached article and the base, the threads of the shoulder bolt can bind in the hole. If thread advancement is forced, galling of the holes and stripping of threads can occur. Alternatively, or in addition, damage to the shoulder of the bolt can occur as it is pushed and rotated into the mis-aligned opening.

Keys and key ways are also used for locating and attaching articles to base members.

However, such means of locating/attaching can be costly to machine onto both items and certainly, does not provide a form of quick connect/disconnect.

A popular locating and fastening system is the Jergen's Ball Lock mounting system. The ball lock is inserted into the mounting hole until its shoulder engages against the accessory, etc., and then a screw with an angled surface is actuated driving three balls against a complimentary angle in the mating accessory. One of the main problems with this system is that resulting binding can make it difficult to insert and remove this system making its use cumbersome and time consuming.

The locator/fastener system of the present invention overcomes these problems and difficulties. The locating and fastening functions are performed by separate elements of the device with the fastener captured within the locator in a manner enabling it to float, so that the fastener has the freedom to engage the threads in the receiver without binding or galling.

A first aspect of the invention comprises a system for precisely positioning and fastening an article to a base, the system including a locator having a retention head on a trailing end portion, a cylindrical body portion with a leading end portion and a precision-machined external surface adapted to fit within an opening of the article to be precisely located, the locator having an internal axial throughbore. Fastening means is received within the axial throughbore such that an attachment portion extends axially beyond the leading end portion of the locator. Retention means secures the fastening means within the internal axial throughbore; whereby a portion of the cylindrical body portion of the locator extends through the article to be precisely located and is received in a precision-machined internal opening of the base and the attachment portion is securely engaged in the base to retain the article in position relative thereto.

The retention means secures the fastening means within the internal axial throughbore in a manner permitting the fastening means to float relative to the locator. The fastening means is preferably a cap screw and the internal axial throughbore has multiple diameters, a first larger diameter to receive the head of the cap screw and the second to receive the threaded body portion thereof. One preferred drive for the cap screw is an internal hex recess. One form of the retention means comprises a spring clip which engages in a slot formed in the retention head of said locator. It will be understood that other retention means could be used without affecting the operation of the device and the retention means could engage other portions of the fastening means, the projecting portion of the fastener, for example.

The retention head of the locator is preferably formed with an undercut whereby tightening the locator onto the article provides a spring pressure generally equivalent to that provided by a lock washer. The system preferably includes a receiver having external threads for engaging in a tapped recess in the base and has the precision-machined internal opening as a first portion of a stepped axial throughbore, the first portion receiving the precision machined external surface of the locator, a second portion of the stepped axial throughbore receiving the attachment portion of the fastening means. The receiver preferably includes a radially extending head portion surrounding a major axial length of the first portion of the stepped recess, the radially extending head portion cooperating with the retention head of the locator to precisely clamp the article relative to the base. Preferably, the receiver is made of metal which has been treated to harden it.

In a second aspect of the invention, the system for precisely positioning and fastening an article to a base, the article having at least one first throughbore with a first center-line and the base having at least one second throughbore with a second center-line, where the system includes a locator having a cylindrical body portion with a leading end portion and a precision-machined external surface adapted to fit within an opening of the article to be precisely located, the locator having an internal axial throughbore; fastening means; a hardened receiver having an externally threaded cylindrical body, a radially extending head portion and having a precision-machined internal opening as a first portion of a stepped axial throughbore, the precision-machined internal opening receiving at least a portion of the precision-machined external surface of the locator, and a second portion of the stepped axial throughbore receiving and securing a portion of the fastening means. The outer peripheral edge of the leading end portion of the locator has a first angular surface formed thereon and a second complementarily angular surface is formed within a leading internal surface of the receiver, a radial extent of the first and second angular surfaces determining an amount of misalignment between the first center-lines and the second-center lines which can be corrected.

In a third aspect of the invention, the system for precisely positioning and fastening at least one article to a base plate includes a sub-base plate removably attached to the base plate, said sub-base plate having i) at least one throughbore with a first center-line, and, ii) means by which the at least one article is attached thereto; b) at least one docking stud attached to the sub-base by which the sub-base is proximately positioned relative to and secured to the base plate; a v-shaped docking stud notch for receiving the at least one docking stud and supporting the sub-base; d) fastening means for engaging attaching the sub-base to the base. Preferably, the fastening means includes at least one locator/fastening means with a precision-machined external surface for engaging in the throughbore in the sub-base plate, the throughbore being a precision-machined throughbore.

Preferably, each locator/fastener means includes a locator having a retention head on a trailing end portion, a cylindrical body portion with a leading end portion and a precision-machined external surface adapted to fit within the precision-machined throughbore in the sub-base, the locator having an internal axial throughbore. Fastening means is received within the axial throughbore such that an attachment portion extends axially beyond the leading end portion of the locator and retention means secures the fastening means within the internal axial throughbore. It is desired that a first angular surface be formed on an outer peripheral edge of the leading end portion of the locator and a second complementarily formed angular surface be formed within a leading internal surface of the receiver, a radial extent of said first and second angular surfaces determining an amount of misalignment between the first center-lines and the second-center lines which can be corrected. The docking stud notch is preferably made of hardened material separate from the base plate and is secured thereto by threaded fasteners.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 3A is a front view of the tombstone shown in FIG. 1;

FIG. 3B is a cross-sectional side view of the tombstone shown in FIG. 3A along line 3B-3B with one sub-base removed;

FIG. 3C is a detailed cross-sectional side view as seen in the circle 3C in FIG. 3B;

FIG. 8B is an front view of the first embodiment of the locator/fastener;

FIG. 8C is a cross-sectional side view as seen along line 8C-8C in FIG. 8B;

FIG. 8D is an enlarged cross-sectional side view as seen in circle 8D in FIG. 8C;

DETAILED DESCRIPTION OF PREFERRED EMBODIMENT(S)

Figure 1:
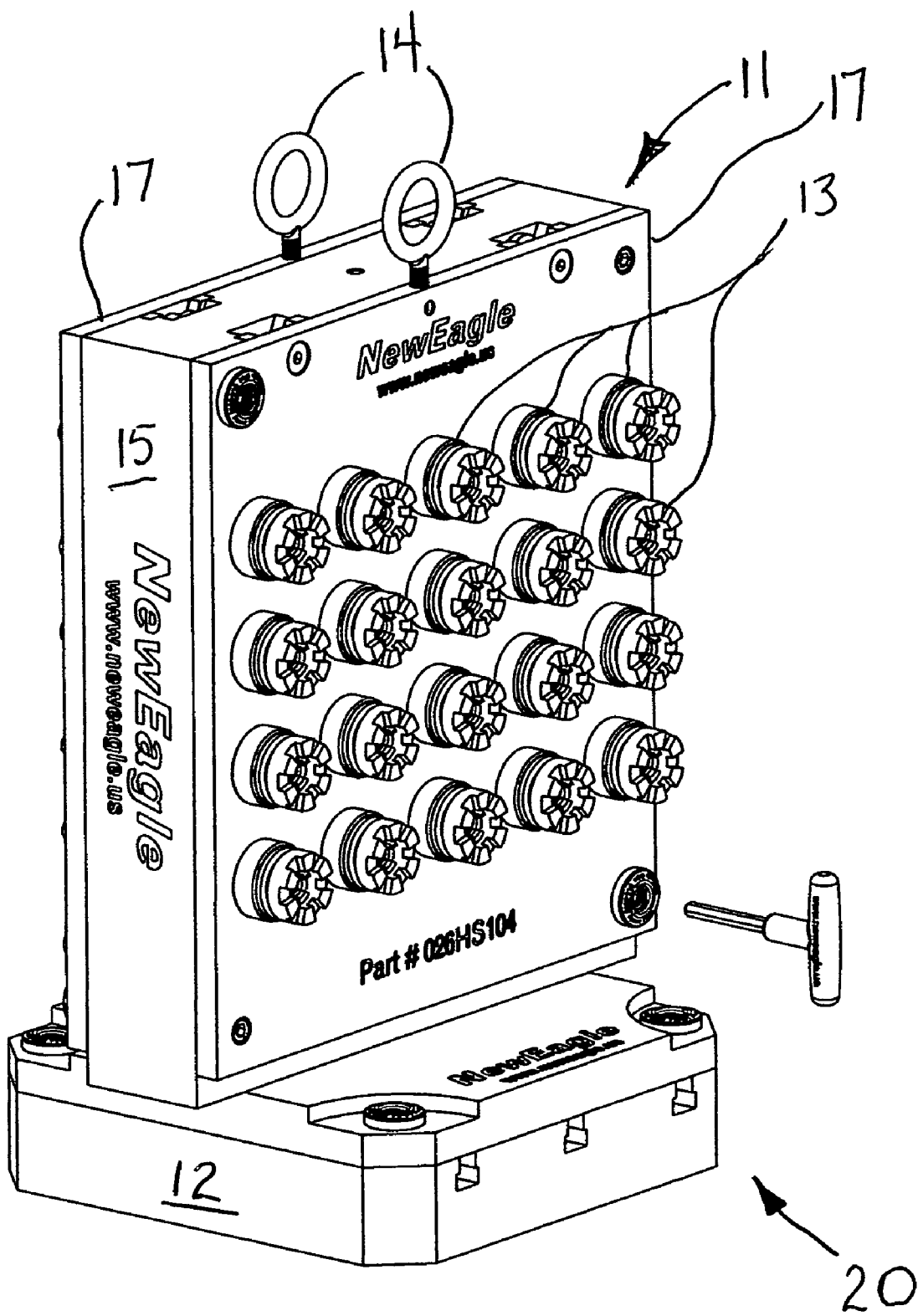
FIG. 1 is a perspective side view of a work holding tombstone employing a first embodiment of the precision positioning and fastening system of the present invention.
Figure 2:
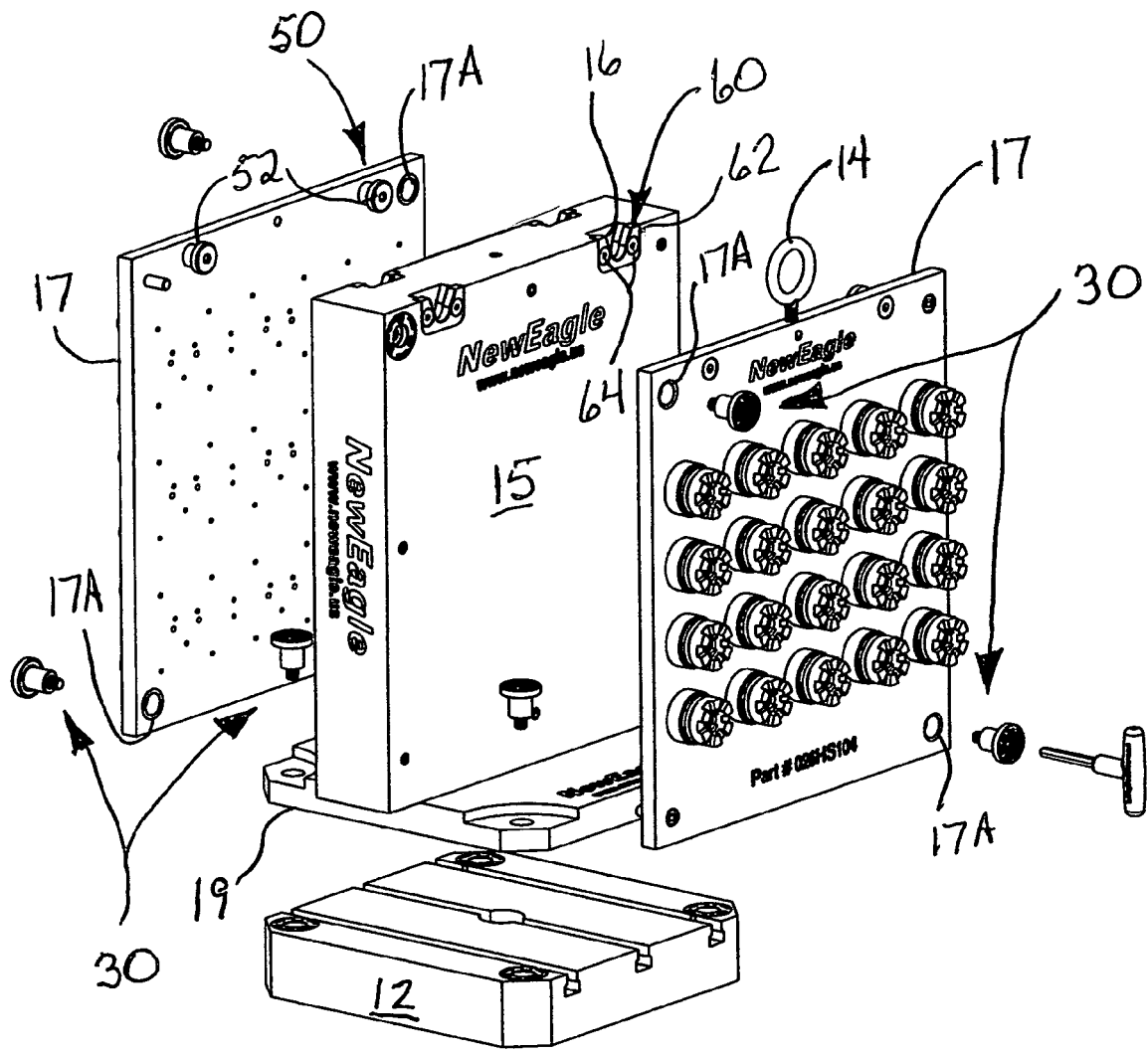
FIG. 2 is an exploded perspective side view of the tombstone of FIG. 1.

A first embodiment of the locating and fastening system of the present invention is depicted in FIGS. 1 and 2 generally at 20. The locating and fastening system 20 of the present invention includes locator/fasteners 30 and a hanger system 50. As depicted in FIGS. 1 and 2, locating and fastening system 20 is used with a workholding chassis or tombstone 11 has secured thereto a number of workpieces 13 for performing machining operations thereon. Tombstone 11 includes a base 15 and two sub-base plates 17 from which workpieces 13 are suspended. Each sub-base plate 17 has a plurality of throughbores with a first set of center-lines 17A. Base 11 has flange 19 extending from either side which is attached to mounting plate 12. Flange 19 can be formed as a separate member and attached to base 11 or may be formed integrally therewith. Eyelets 14 are provided to enable sub-base plates 17 to be lifted and placed upon base 11. Locator/fasteners 30 can be used to fix flange 19 of base 11 to mounting plate 12.

Figure 8A:
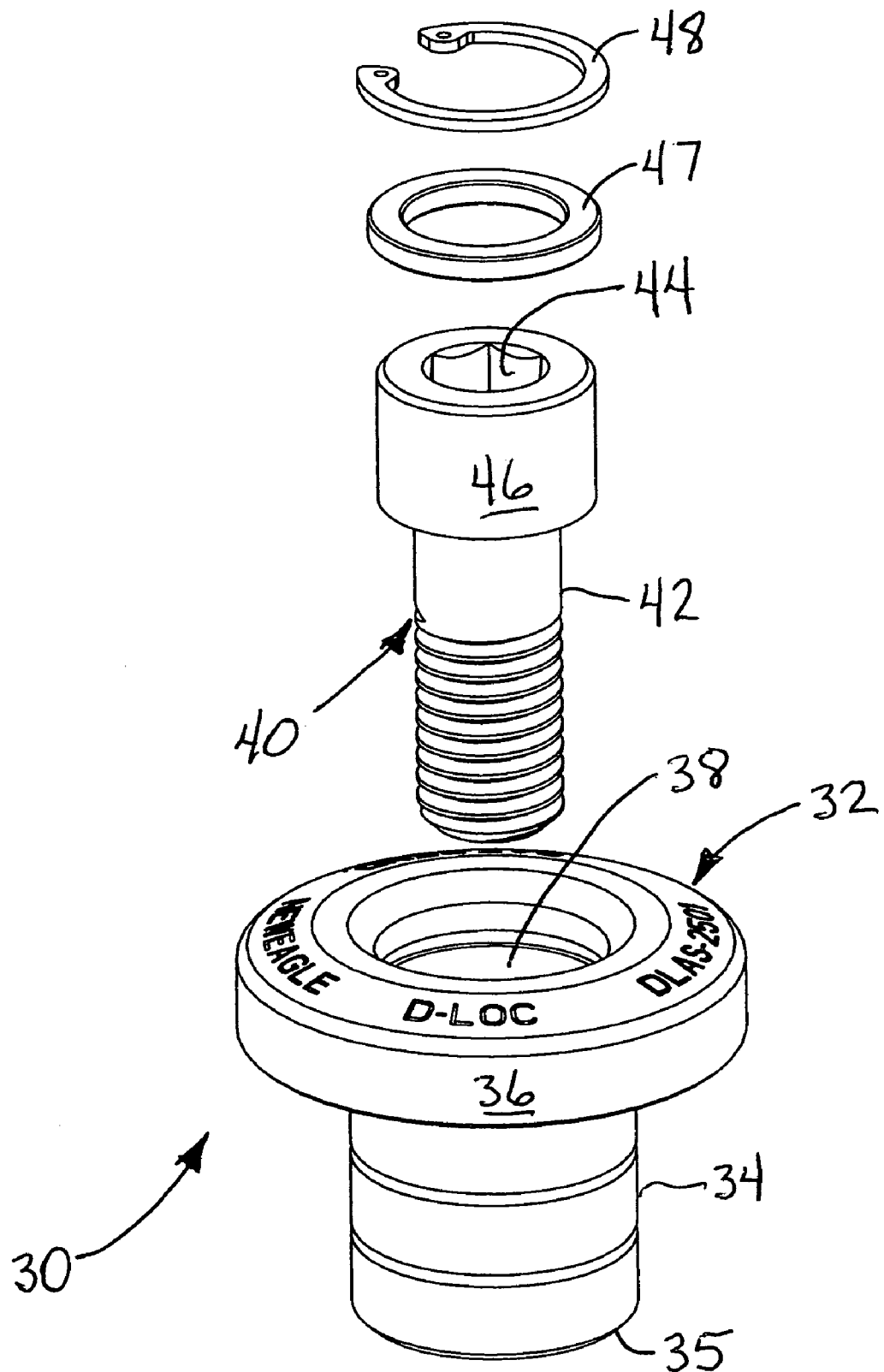
FIG. 8A is an exploded perspective view depicting a first embodiment of the locator/fastener used in the first embodiment of the present invention.

The details of the locator/fastener 30 is shown in FIG. 8A. The locator 32 comprises cylindrical body 34 with a leading end 35, the cylindrical body 34 having a precision-machined outer surface. Retention head 36 is formed on the trailing end portion of locator 32. An axial throughbore 38 extends through the locator. As best seen in FIG. 8C, throughbore 38 preferably has a stepped configuration, a first small diameter 37 receives the shaft 42 of fastener 40. While fastener 40 is depicted here as a cap screw having an internal hex drive 44, it will be appreciated that fastener 40 can take other forms without departing from the scope of the invention. A second larger diameter 39 receives the head of 46 fastener 40.

A washer 47 and spring clip 48 comprise retention means used to secure fastener 40 within locator 32. A slot 33 formed in retention head 36 receives spring clip 48 to secure fastener 40 within the axial throughbore 38. This manner of retaining the fastener 40 within locator 32 enables it to float in throughbore 38 such that the protruding end 49 is free to hunt for the threaded recess it is to engage without binding or galling the threads. It will be understood that other forms of retention means may be employed including, but not limited to, a circlip engaging the protruding end 49 of the fastener 40 below the leading end 35 of locator 32. As best seen in FIG. 8D, retention head 36 on locator 32 is formed with an undercut angle at 36' which is on the order of 5°. When the fastener 40 is tightened into the threaded receiving hole, retention head 36 flexes functioning as an included lock washer.

As seen in FIGS. 2 and 3A-3C, hanger system 50 includes at least one docking stud 52 attached to the sub-base plate 17 by fastener 54. More preferably, for most applications, hangar system 50 will include at least two docking studs 52. Docking stud 52 has an enlarged head 56 and a shoulder 58. Base 15 has formed thereon at least one generally v-shaped docking stud notch 60. While stud notch 60 may be machined into base 15, preferably a separate element 62 with the notch 60 formed therein is attached in a recess 16 machined in base 15 using threaded fasteners 64. In this manner, stud notch 60 can be made of hardened material. As seen in FIG. 3C, the weight of sub-base plate 17 is suspended on the shoulder 58 contacting stud notch 60 in a manner that enlarged head 56 is held out of contact with the recess 16, eliminating the possibility of wearing of the softer material of base 15.

Figure 4B:
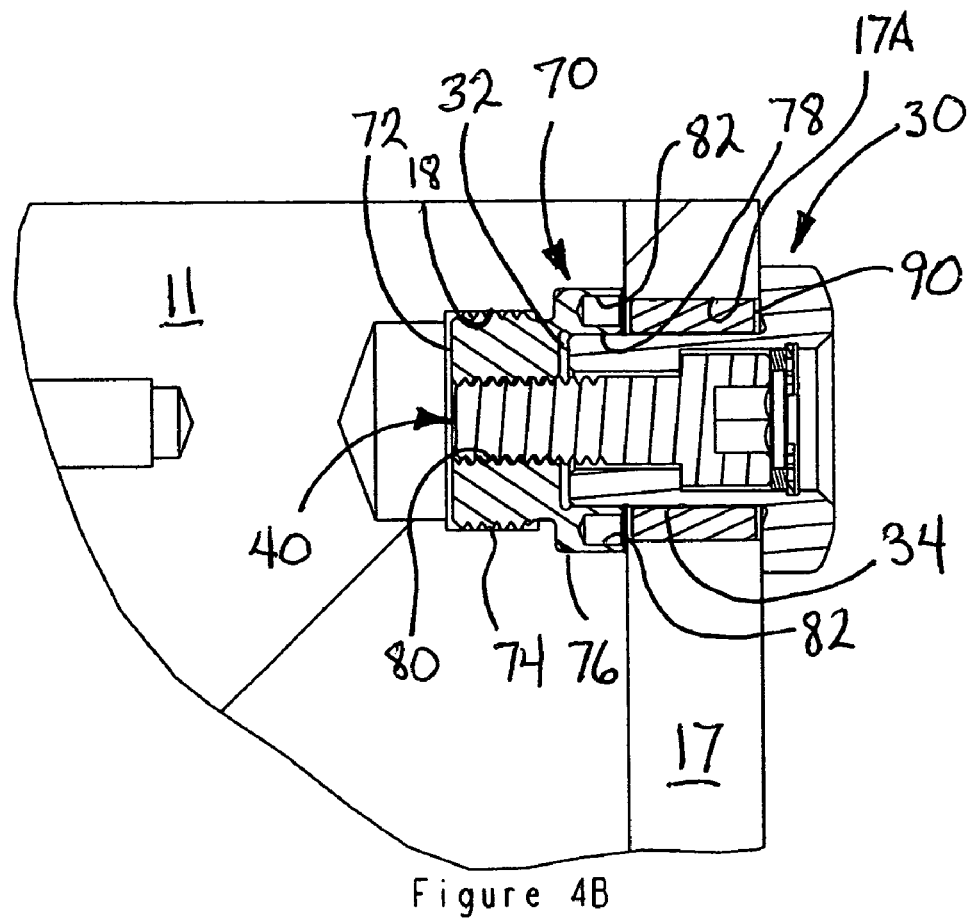
FIG. 4B is a detailed cross-sectional side view as seen in circle 4B in FIG. 4A.
Figure 4A:
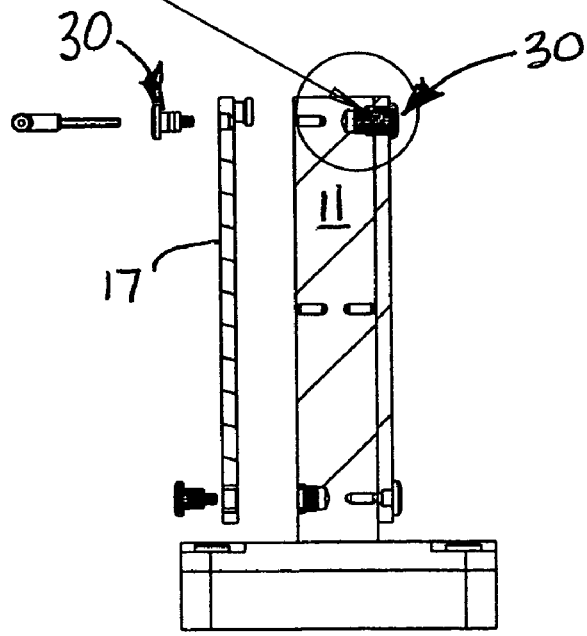
FIG. 4A is a cross-sectional side view as seen along line 4A-4A in FIG. 3A with one sub-base removed.

Turning now to FIGS. 4A-4B, locator/fastener 30 will engage in a receiver 70. Receiver 70 can take any of several forms. As shown in FIGS. 4A-4B, receiver 70 has a cylindrical body portion 72 having external threads 74. A radially extending head portion 76 has a precision-machined internal opening 78 as a first portion of a stepped axial throughbore, opening 78 being adapted to receive at least a portion of the precision-machined external surface of body 34 of the locator 32. A second smaller internally threaded diameter 80 receives the threads of fastener 40. Regardless of the embodiment of receiver 70, once installed in base 15, openings 78 have a second set of center-lines. By forming receiver 70 separately from base 15, receiver can be made of harder material, say for example, steel as opposed to aluminum, and can undergo heat treatment such as case hardening, to make it wear longer. A set of drive openings 82 can be formed in the head portion 76 enabling receiver 70 to be tightened into opening 18 in base plate 15. An optional wear bushing 90 can be inserted into the opening 17A in sub-base plate 17 for applications where frequent removal and installation of locator/fastener 30 is anticipated.

Figure 5A:
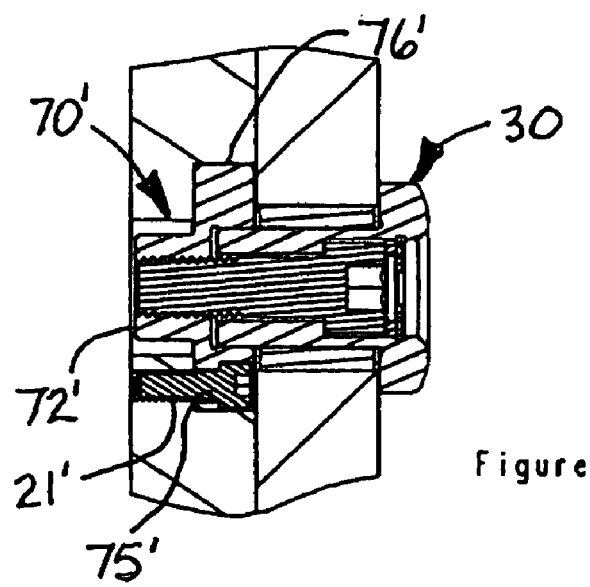
FIG. 5A is a detailed cross-sectional side view as seen in circle 4B showing a second embodiment of receiver.
Figure 5B:
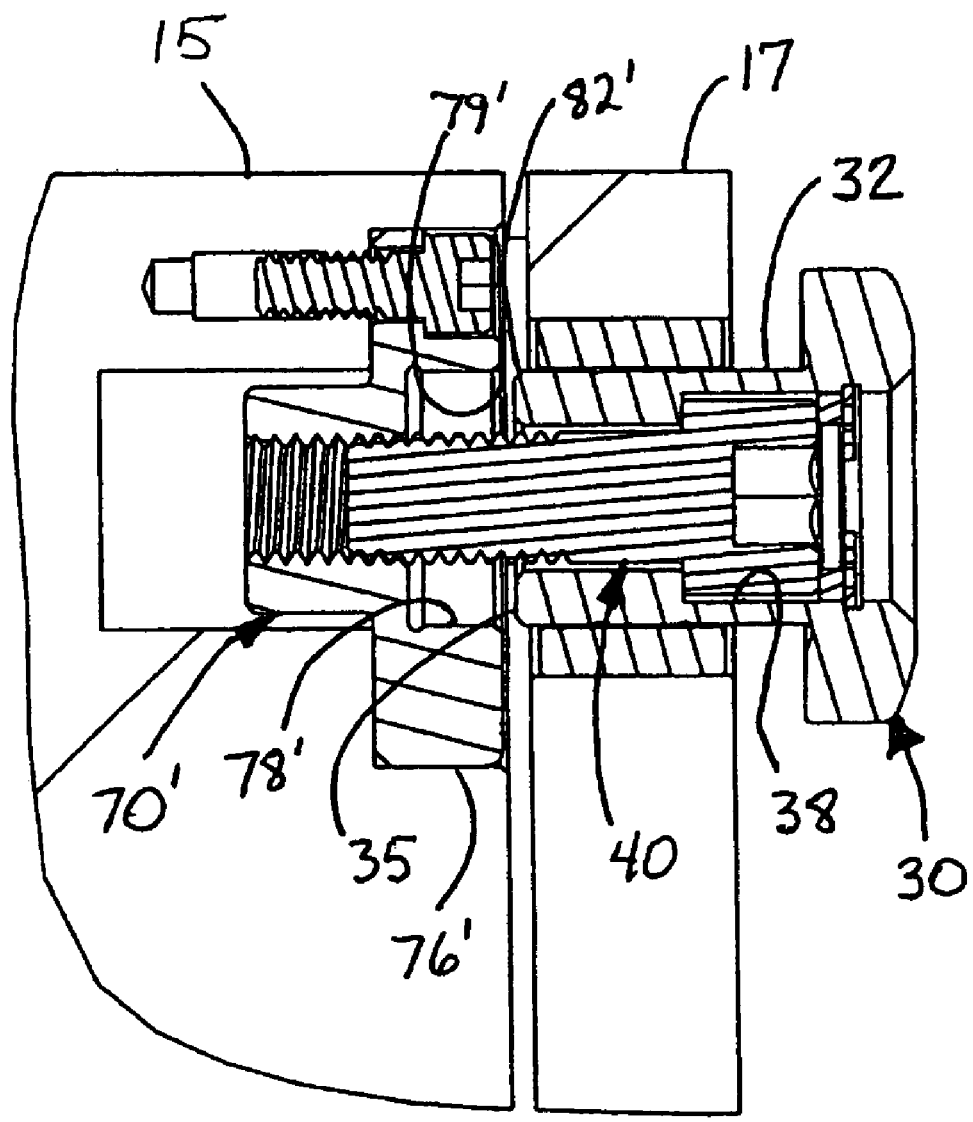
FIG. 5B is a detailed cross-sectional side view with portions partially disassembled.

A second embodiment of receiver is shown in FIGS. 5A, 5B generally at 70'. In this embodiment, rather than having integral threads on cylindrical body portion 72', separate threaded fasteners 21' engage through holes 75' in head portion 76' to secure it in opening in base 11'. FIG. 5B depicts an important feature of each of these receivers and locator fasteners. As seen there, lead end 35 of locator 32 is formed with an angular surface 82'. This angular surface 82' may take the form of a chamfer or radiused surface. A complimentarily shaped surface 79' is formed in the precision-machined opening 78' in head portion 76'. These complementary surfaces enable the locator 32 to adjust for mis-alignment between the base 11 and sub-plate 17 which produces mis-alignment between the receiver 70' and the locator/fastener 30. The combination of these cooperating angular surfaces 79' and 82' and the floating of fastener 40 within the throughbore 38, enable these misalignment difficulties to be overcome.

Figure 6:
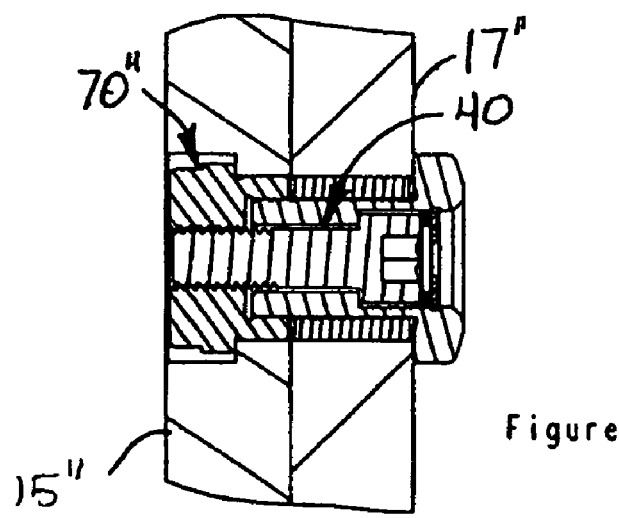
FIG. 6 is a detailed cross-sectional side view as seen in circle 4B showing a third embodiment of receiver.

FIG. 6 shows yet a third embodiment of receiver shown generally at 70". This receiver 70" is installed on the opposite side of base 15" using a press fit. Obviously, body 72" could be threaded or separate fasteners could be employed; however, since fastener 40 will pull the receiver 72" against the rear portion of sub-base plate 17", these additional fastening means are unnecessary.

Figure 7:
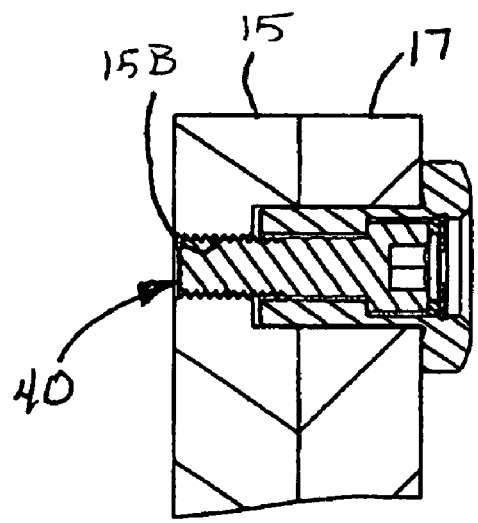
FIG. 7 is a detailed cross-sectional side view as seen in circle 4B showing a fourth embodiment of receiver.

FIG. 7 shows a fourth embodiment where the material of base 15 is sufficiently hard to permit fastener 40 to thread directly into a tapped opening 15B. Since this application uses harder materials, the optional wear bushing in sub-base plate 17 can also be omitted.

Figure 9:
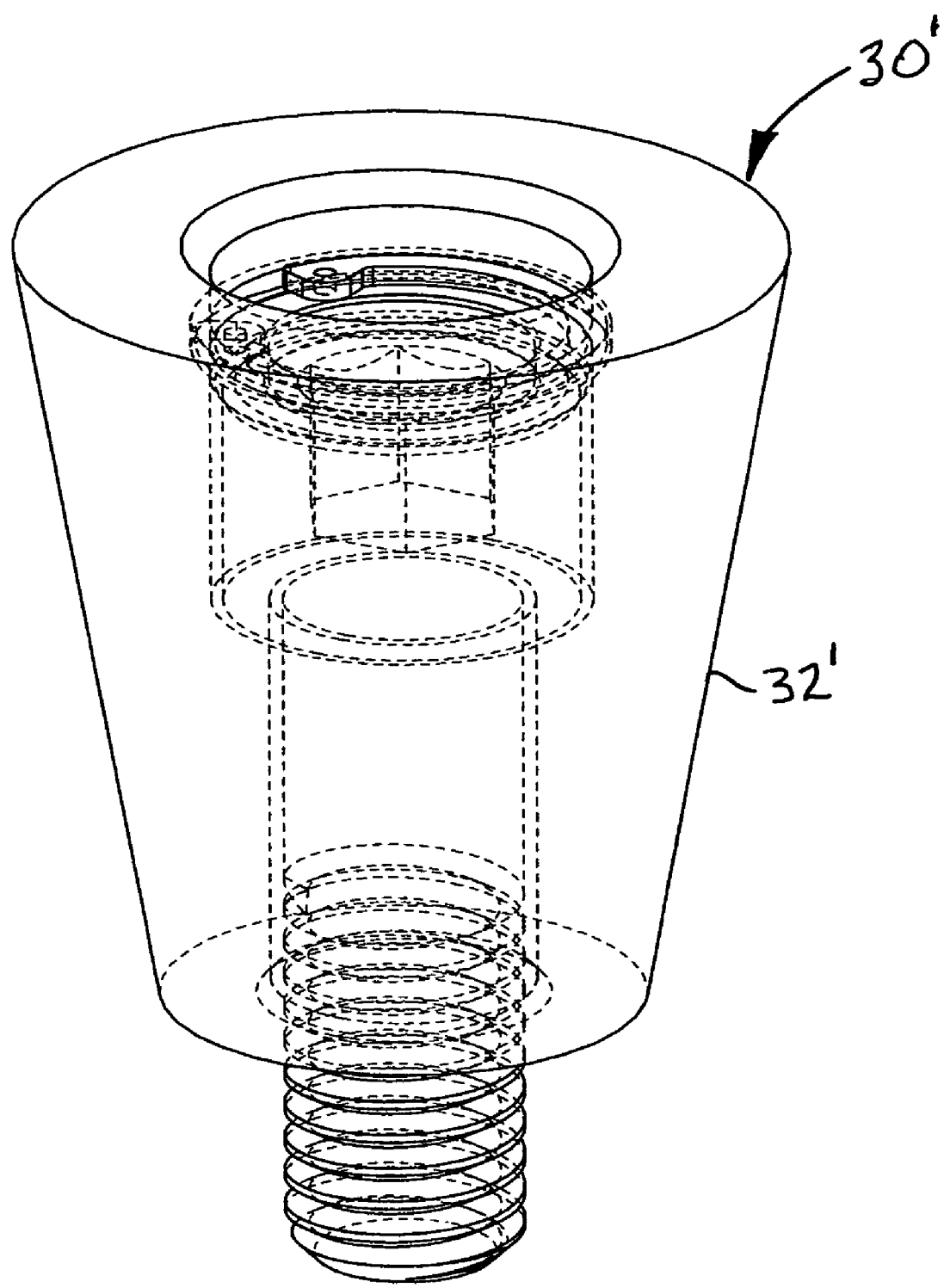
FIG. 9 is an enlarged perspective side view of a second embodiment of locator/fastener used in the first embodiment of the system of the present invention.

FIG. 9 depicts a second embodiment of locator/fastener 30'. In this embodiment, the external surface of locator 32' is formed as a frusto-conical member. Such a configuration will accommodate a significantly larger amount of mis-alignment than the first, preferred embodiment.

Figure 10A:
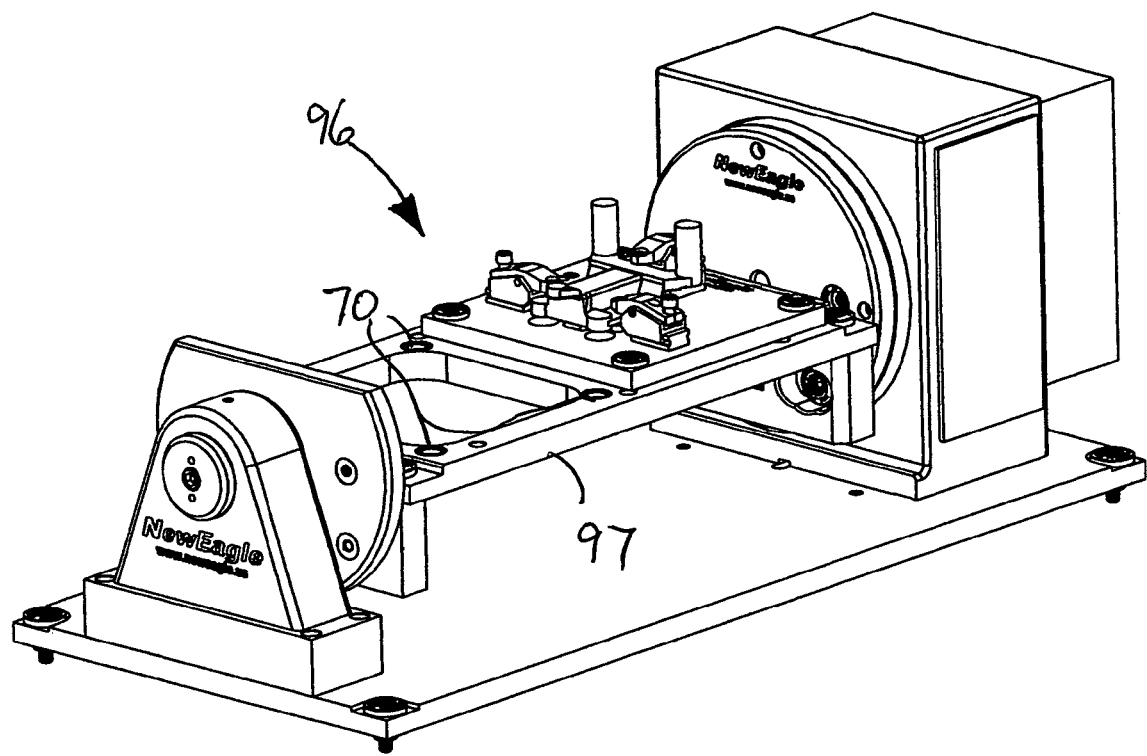
FIG. 10A is a perspective view of an industrial application of the locator/fastener of the present invention; and, FIG. 10B is an exploded perspective view of the industrial application shown in FIG. 10A.
Figure 10B:
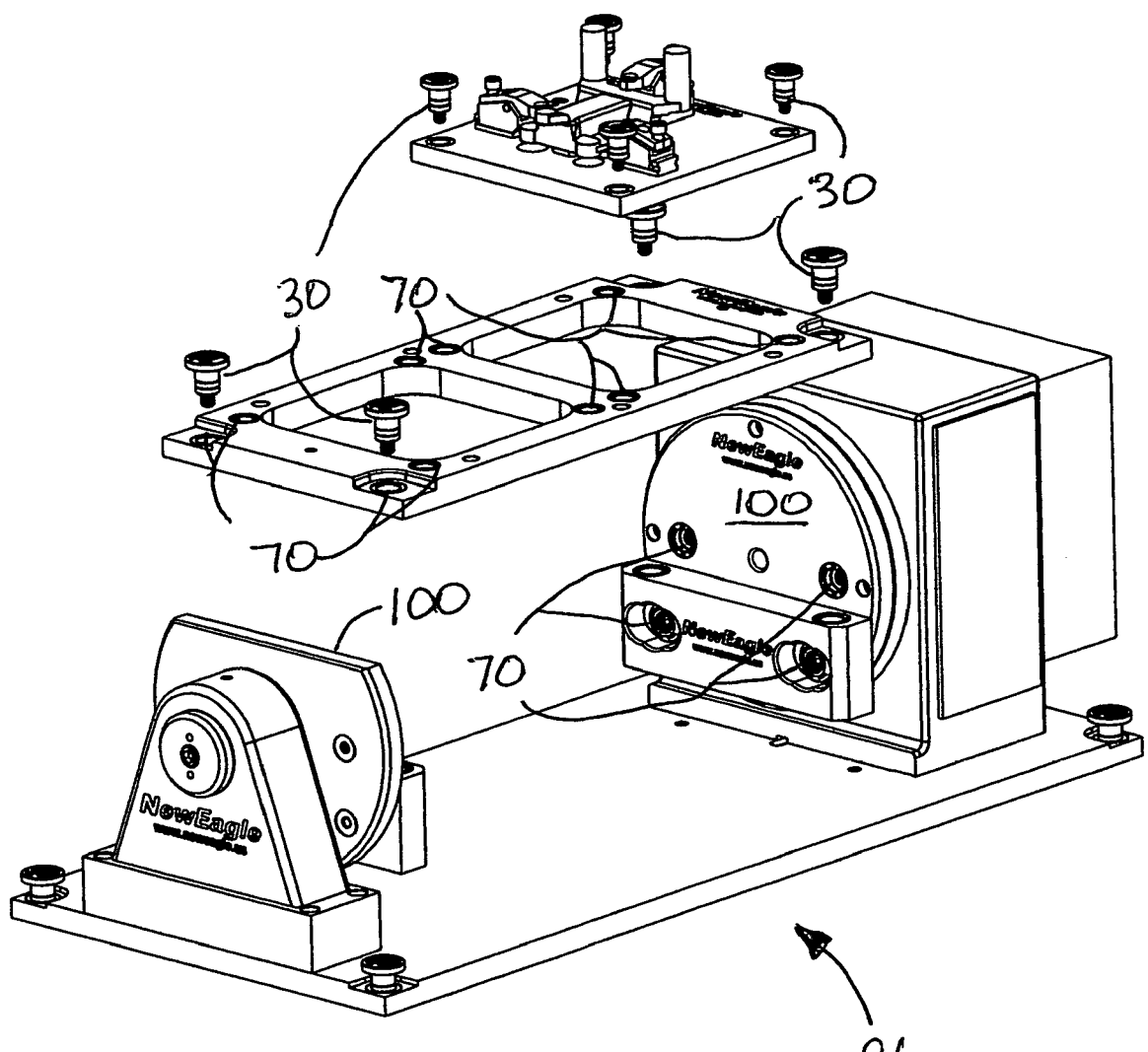

FIGS. 10A and 10B depict an alternate industrial application for the locator/fastener system of the present invention. The device 96 depicted there is fourth-axis trunnion fixture for machine operations performed on a vertical milling machine, for example. Sub-base plate 97 has a plurality of receivers 70 therein. Fixture plate 98 is secured using locator/fasteners 30. Other locator/fasteners 30 attach sub-base plate 97 to brackets 99 and brackets 99 to face plates 100. The use of the precision locating and fastening system 20 enable fixture plate 98 to be quickly and easily removed and adjustments in center-line height of the sub-base plate 97.

In utilizing the precision fastening and locating system 20 of the present invention, the hangars 50 will typically be attached to base 11 and sub-base plate 17 in a manner such that the first set of center-lines of throughbores 17A will be located on the order of 0.015 inch below the second center-lines of throughbores 78 in receivers 70. The floating of fastener 40 in locator 32 enables the protruding end 49 to hunt for the threads 80 in receiver 70 without binding or galling. As the angular surface 82' engages complimentary surface 79', precision-machined exterior of body 35 tracks into precision machined internal surface 78' and lifts sub-base 17 the 0.015 inch to bring the first center-lines of 17A into alignment with the second center-lines of throughbores 78 as fastener 40 narrows the gap between retention head 36 and head portion 76', eventually gripping sub-base plate 17 therebetween.

Various changes, alternatives and modifications will become apparent to one of ordinary skill in the art following a reading of the foregoing specification. For example, while the locator/fastener system has been disclosed for use with, and is particularly well suited for, workpiece fixtures, the system can be employed anywhere two items are to be fastened together. It is intended that any such changes, alternatives and modifications as fall within the scope of the appended claims be considered part of the present invention.

I claim:

1. A 2-piece positioning and fastener system in which a first element positions an article relative to a baseplate, the article having an opening formed therein, and a second element attaches the article to the baseplate, said 2-piece system comprising a) a first positioning and locating member, said first member having a cylindrical body portion formed integrally with and extending from a retention head portion as a single piece, said retention head portion being positioned at a trailing end of said body portion and extending radially outwardly therefrom, said cylindrical body portion having a generally constant cylindrical diameter extending from said retention head portion throughout its length to allow said first member to be removed from the opening of the article from a side of the article which is engaged by said retention head, said first member having a precision-machined external surface on a leading end thereof which is adapted to be received in the opening formed in the article and an unthreaded internal axial throughbore extending entirely there through;

b) a second fastening member for attaching the workpiece to the base plate, said fastening member having a head portion which is totally received within said internal axial throughbore of said first member, an externally threaded attachment portion which extends beyond said leading end of said first positioning and locating member;

c) removable retention means engaging a trailing end of said head portion of said fastening member for securing said fastening member within said internal axial throughbore of said positioning and locating member against undesired removal therefrom;

whereby a portion of said cylindrical body portion of said first positioning and locating member extends through the article to be precisely located and is received in a precision-machined internal opening of the base plate and said threaded attachment portion of said second fastening member is securely engaged in the base plate to retain the article in position relative thereto.

2. The system of claim 1 wherein said removable retention means secures said fastening member within said internal axial throughbore in a manner permitting said second fastening member to float relative to said first positioning and locating member, that is, to have unrestricted rotational movement relative to said first positioning and locating member with a sufficient amount of axial and lateral movement to enable said threaded attachment portion to hunt a misaligned aperture in said base plate.

3. The system of claim 2 wherein said unthreaded internal axial throughbore has multiple diameters.

4. The system of claim 3 wherein said second fastener member comprises a cap screw with an internal hex drive recess formed in a head portion thereof.

5. The system of claim 4 wherein said retention means comprises a spring clip and a washer, said spring clip engaging in a slot formed in said retention head portion of said first positioning and locating member.

6. The system of claim 1 further comprising an undercut on said retention head portion of said positioning and locating member whereby tightening said second fastening member into the base plate enables said retention head to provide a spring pressure generally equivalent to that provided by a lock washer.

7. The system of claim 1 further comprising a receiver having external threads for engaging in a tapped recess in the baseplate and having said precision-machined internal opening as a first portion of a stepped axial throughbore, said first portion receiving a portion of said precision machined external surface of said locator which extends through the article being retained, a second portion of said stepped axial throughbore being internally threaded and receiving said externally threaded attachment portion of said fastener member.

8. The system of claim 7 wherein said receiver further comprises a radially extending head portion surrounding a major axial length of said first portion of said stepped recess, said radially extending head portion cooperating with said retention head of said locator to precisely clamp the article relative to the base as said externally threaded attachment portion threadingly engages said internally threaded second portion of said stepped throughbore of said receiver.

9. The system of claim 7 wherein said receiver is received in a blind orifice of the base plate.

10. A 3-piece system for precisely positioning and fastening an article to a base plate, the article having at least one first throughbore with a first center-line and the base plate having at least one at least partially threaded recess with a second center-line, said system comprising:

a) a first locator having a cylindrical body portion formed integrally with and extending from a retention head portion as a single piece, said retention head portion being positioned at a trailing end of said body portion and extending radially outwardly therefrom, said cylindrical body portion having a generally constant cylindrical diameter extending from said retention head portion throughout its length to allow said first member to be removed from the opening of the article from a side of the article which is engaged by said retention head, said cylindrical body portion having a precision-machined external surface on a leading end portion adapted to fit within an opening of the article to be precisely located, said locator having an unthreaded internal axial throughbore and an outer peripheral edge of said leading end portion having a first angular surface thereon;

b) second fastening means for securing the article to the base plate, removable retention means for securing said fastening means in said locator in a manner preventing undesired removal, said fastening means including a threaded portion which extends beyond said leading end portion of said first locator;

c) a third member comprised of a hardened receiver having a cylindrical body, securing means for retaining said hardened receiver in the base plate, a radially extending head portion integrally formed therewith and having a precision-machined unthreaded internal opening as a first portion of a stepped axial throughbore, said precision-machined internal opening receiving at least a portion of said precision-machined external surface of said locator and having a second complementarily angular surface formed within a leading internal surface of the receiver for engaging said outer peripheral edge of said leading end portion to accommodate axial misalignment of said locator and said receiver, and a second portion of said stepped axial throughbore being threaded and receiving and securing said threaded portion of said fastening means.

11. The system of claim 10 wherein a first angular surface is formed on an outer peripheral edge of said leading end portion of said locator and a second complementarily formed angular surface is formed in a leading internal surface of said receiver, a radial extent of said first and second angular surfaces determining an amount of misalignment between said first center-lines and said second-center lines which can be corrected.

\* \* \* \* \*